Figure 1:
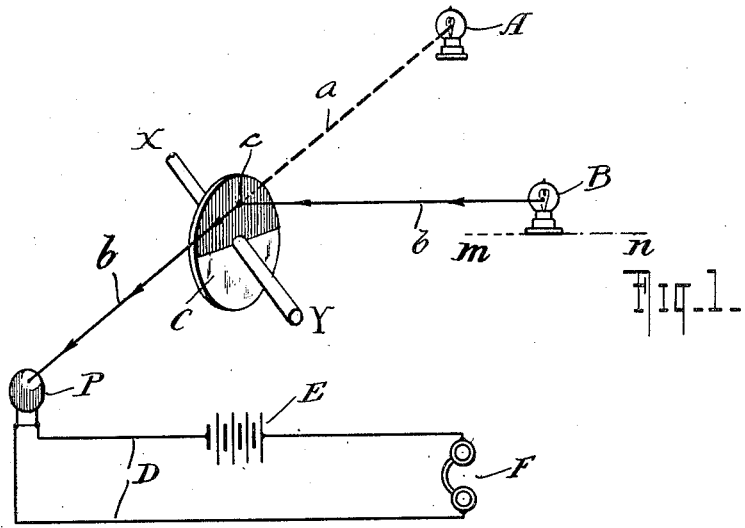

July 28, 1931.  C. W. KEUFFEL  1,816,047
PHOTOMETER
Filed June 16, 1927   2 Sheets-Sheet 1

INVENTOR
CARL W. KEUFFEL
BY
Lotka, Kehlenbeck & Harley
ATTORNEYS

July 28, 1931.  C. W. KEUFFEL  1,816,047
PHOTOMETER
Filed June 16, 1927   2 Sheets-Sheet 2
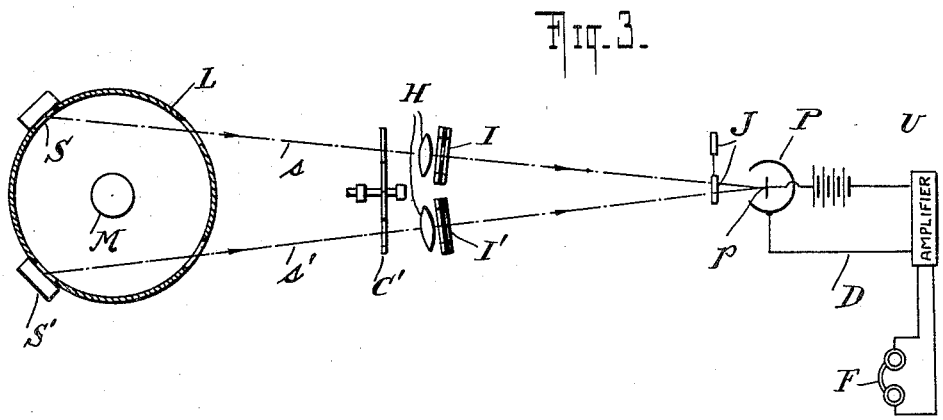
Fig. 3.
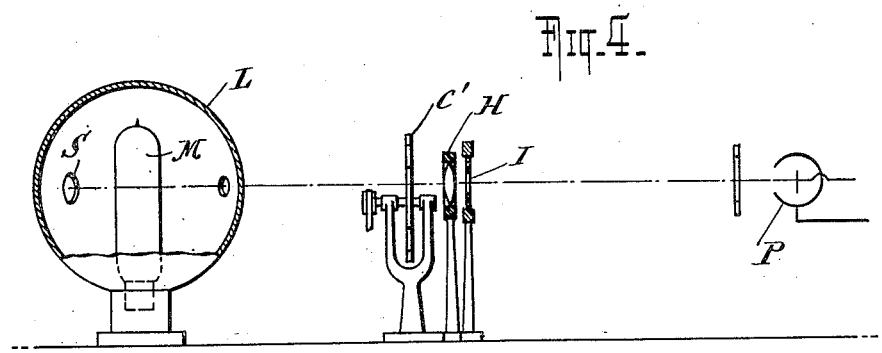
Fig. 4.
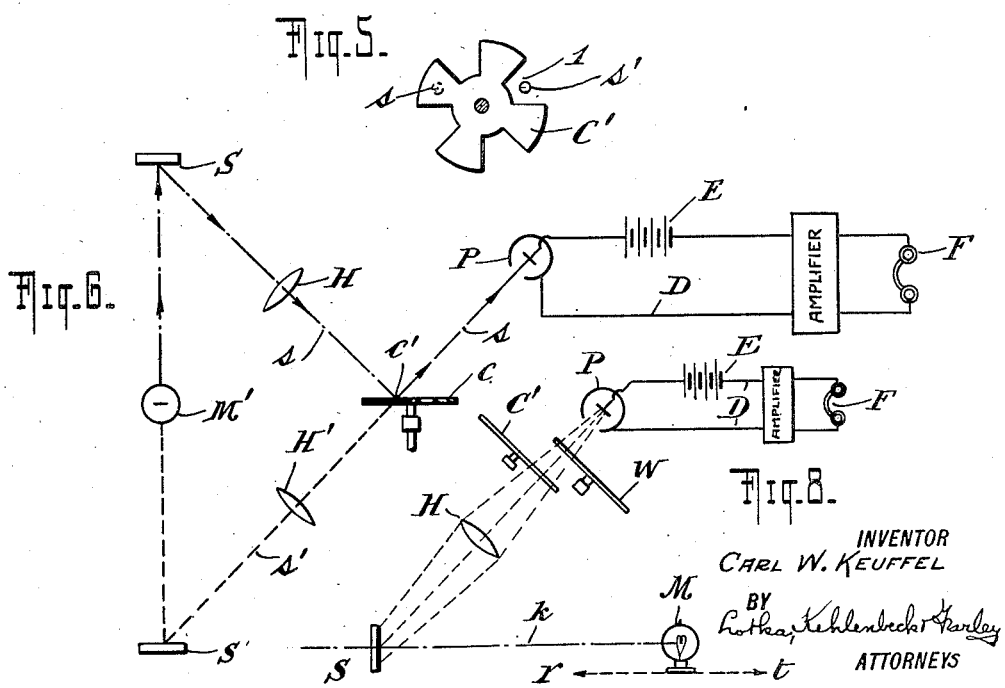
Fig. 5.
Fig. 6.
Fig. 8.
INVENTOR
CARL W. KEUFFEL
BY
ATTORNEYS Patented July 28, 1931

1,816,047

UNITED STATES PATENT OFFICE

CARL W. KEUFFEL, OF WEEHAWKEN, NEW JERSEY, ASSIGNOR TO KEUFFEL & ESSER COMPANY, OF HOBOKEN, NEW JERSEY, A CORPORATION OF NEW JERSEY

PHOTOMETER

Application filed June 16, 1927. Serial No. 199,162.

This invention relates to photometers and has for its principal object to provide a new and improved method of comparing two beams or rays of light with respect to their brightness and intensity and also to provide new and improved apparatus for carrying out the principles of said method.

In accordance with the principles heretofore employed, in what may be termed practical or commercial photometry, as distinguished from purely scientific or laboratory experimental work, the comparison of two beams of light has been done by direct visual observation of the light beams or of an image thereof, as for example, in the Lumner Brodhun contrast photometer, or in the Bunsen grease spot photometer.

As the analysis of color by the employment of photometry is becoming more and more important from a commercial standpoint as well as from a purely scientific standpoint, it has been increasingly desirable to provide more accurate methods and instruments for investigating and comparing beams of light and particularly for decreasing, to the minimum, errors due to defects in vision, such as color blindness in the individual observer. Examples of such instruments are disclosed in my co-pending applications for Letters Patent of the United States Serial No. 683,996, filed January 2, 1924, and Serial No. 62,502, filed October 15, 1925. I have discovered, however, that, although such instruments may be constructed so that the instrument will perform its functions with mathematical accuracy, the correctness of the results of observations or measurements made with any instrument, in which readings depend upon the direct visual observation of the light beams, is limited by the degree of sensitiveness residing in the eye of the observer. This degree ranges from one per cent variations, in observations of exceptionally good observers, to two to three per cent variations in the observations of the average person. It will thus be seen that further progress of the art of photometry towards securing more accurate results can not be had by the production of more accurate instruments as long as the correctness of results depends upon the direct visual observation of the light beams under investigation.

In accordance with the principles of the present invention, instead of resorting to the direct visual observation method, I employ an indirect method in which the light under investigation is directed into a photo-electric cell to cause an eletcric current to flow in a circuit including said cell, and such current is preferably used to induce a current in another circuit containing a suitable electric detecting device, preferably one of extreme sensitivity such, for example, as an ear-phone.

In the preferred form of the invention, light directed into the photo-electric cell is interrupted at a certain rate which corresponds to the vibration rate of audible sound, and the indicating or detecting device comprises an ordinary radio head or ear phone set in the induced current circuit, the sounds produced by the current alternations in such circuit being brought to the desired intensity by the use of any of the well known methods of sound amplification, such, for example, as used in radio telephony. Instead of an audible indicator, I may, however, employ any visual detector or indicator such as a neon glow lamp which possesses the required sensitivity and responds practically instantaneously to current variations.

Figure 2:
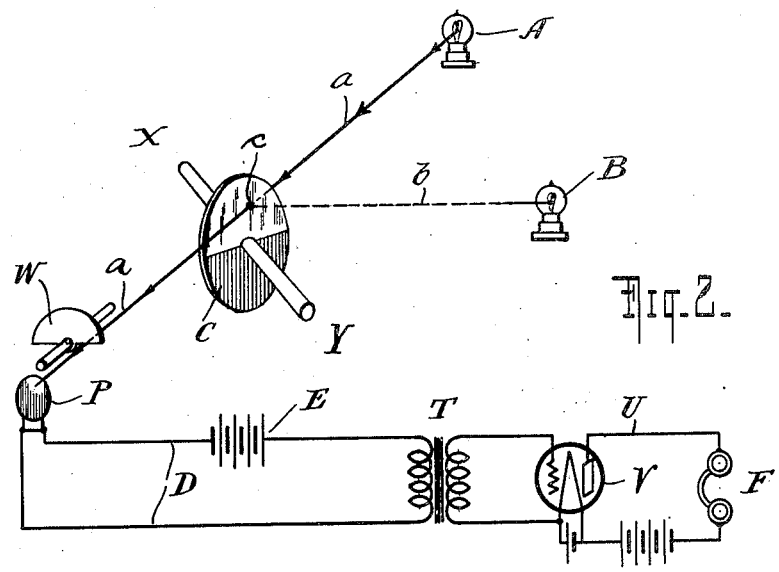
Figure 7:
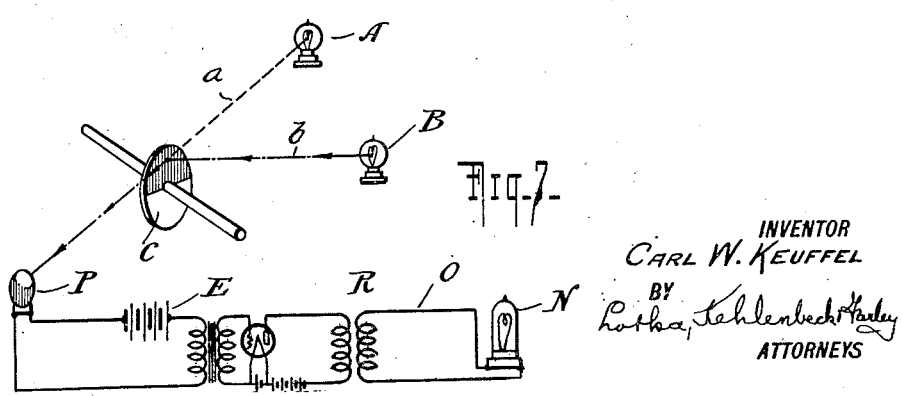

In the accompanying drawings in which several different forms of apparatus embodying the principles of my invention are diagrammatically illustrated, Fig. 1 is a diagrammatic perspective view of a simple form of apparatus without audio-amplification and showing one position of the beam interrupter; Fig. 2 is a view similar to Fig. 1 with the beam interrupter moved through an angle of 180°, and also showing diagrammatically the use of audio-amplification; Fig. 3 is a diagrammatic plan view of an apparatus for reflection measurements; Fig. 4 is a side elevation of the apparatus shown in Fig. 3; Fig. 5 is a detail of the beam interrupter of Figs. 4 and 5; Fig. 6 is a plan view of another form of apparatus for reflection measurements; Fig. 7 is a view similar to Fig. 2 of a similar apparatus, but in which a visual detector or indicator is used in place of the audible indicator, and Fig. 8 is a diagrammatic plan of an apparatus in which, instead of a pair of beam, only a single light beam is employed.

As shown in Figs. 1 and 2, the beams $a$, $b$ from a pair of light sources A, B respectively, shown as ordinary incandescent lamps, intersect at an angle of 90° at the point $c$. Rotatably mounted on an axis X—Y, which extends at an angle of 45° to the beams $a$, $b$, and below the intersection $c$ thereof, is a glass disc C, one half of which is silvered and the other half is left clear.

Located in the path of the beam $a$ so that the light of said beam will fall upon it, is a photo-electric cell P, connected in the circuit D, which circuit includes a battery E and a pair of ear phones F. The light source B is mounted for movement along the line $m$—$n$ to and from the points of intersection of the beams $a$—$b$.

The manner in which the apparatus of Fig. 1 operates is as follows: Assuming that the sectored disc C is revolved upon its axis X—Y, when the silvered, or mirror portion thereof is passing through its upper half of revolution as shown in Fig. 1, the beam $a$ will be intercepted, while the beam $b$ will be reflected and will be directed so that it will fall upon the cell P. When the clear half of the disc C is passing through the upper half of the path of its revolution, the beam $a$ from the light source A will pass through the clear half of the disc and will fall upon the photo-electric cell P, while the beam $b$ from the light source B will pass through the clear half and will not be directed upon the photo-electric cell, as will be readily understood from an inspection of Figs. 1 and 2 of the drawings. It will thus be seen that during each revolution of the disc C the beams $a$—$b$ are alternately directed upon the photo-electric cell and prevented from reaching it. If now the disc C is rotated at a speed of, for example, 256 revolutions per second, a fluctuating current will be produced in the circuit D if the intensities of the beams $a$—$b$ are unequal. This current fluctuating or vibrating at a rate of 256 vibrations per second will produce the sound of middle C in the ear phones F. Movement of the light B along the line $m$—$n$ obviously will vary the amount of light received by the cell and consequently the loudness of the sound heard at the ear phones F will vary. When the light B is moved to a point such that the intensity of the beam $b$ at the photo-electric cell equals the intensity of the beam $a$ at such cell, there will be no fluctuations of the current in the circuit D and therefore no sound will be produced in the ear phones F.

It will thus be seen from the above that the presence or absence of sound in the ear phones furnishes a means whereby the intensity of the light from the two light sources A—B may be readily and accurately determined, the absence of sound being the criterion for equal intensity. By measuring the distances of the light sources A—B from the point of intersection $c$ of the beams $a$—$b$, the relative intensities of the two light sources may be readily and accurately determined in accordance with the well known principles. Obviously, a scale may be located in juxtaposition to the movable light source B, and a light source A of known value may be selected as a standard with which the light source B may be compared, thus permitting the intensity of the beam $b$ to be readily ascertained by a direct reading from the scale. While I have shown the light source B as the movable one and the light source A as fixed, it is obvious that either source of light might be made the movable one.

In order to secure very accurate results, the sound produced may be amplified to any extent whatsoever, by the use of the well known audio amplification methods, such as are used in radio telephony, so that very small differences in intensity of the light beams falling upon the photo-electric cell P may be made to produce comparatively loud sounds in the ear phones. In Fig. 2 of the drawings I have shown, in connection with the same apparatus as shown in Fig. 1, but with the sectored disc moved through an angle of 180°, an application of the use of audio amplification to the apparatus. In this figure of the drawings, the fluctuating current in the circuit D is transmitted by induction, through the transformer T to the circuit U, which circuit contains one or more vacuum tube amplifiers V, having their plates, grids and filaments connected in accordance with any of the well known and commonly used audio amplification principles and having the ear phones F in such circuit.

When the sound in the ear phones approaches the vanishing point, obviously it will decrease until only a slight hum will be produced. Consequently a condition might be reached such that the hum, being continuous and of low volume, would not be detected. In order to insure that the presence of a hum of very low volume can be readily detected, I prefer to employ a second interrupting 180° sectored disc W, located, as shown in Fig. 2, close to the cell P and rotating at a speed of, say, one revolution per second, so that the beam will fall on the cell for ½ second and be interrupted for ½ second, thus rendering a hum of very low intensity readily discernible.

In Figs. 1 and 2 of the drawings, I have shown an apparatus in which the principles of the invention are used for the comparison of light beams coming directly from a light source. If it is desired to measure the light reflection properties of surfaces, the apparatus shown in Figs. 3 and 4 may be employed.

As shown in Figs. 3 and 4, a spherical illumination box L is provided with a lamp M, the light from which is adapted to fall upon the surfaces of the samples S—S', reflecting powers of which are to be compared. The beams reflected from these surfaces are directed at an angle to each other and intersect at the point p at which point a photo-electric cell P is located. Situated between the point p and the surfaces S, and rotatably mounted upon an axis which lies substantially upon the bisector of the beams s—s', is a sectored disc C'. The disc C' is shown in Fig. 5 of the drawings as having a plurality of sectored cutouts 1, so arranged that when the disc is rotated, the beams s—s' will be alternately intercepted and permitted to pass, as will be readily understood. Located between the disc C' and the photo-electric cell P are a pair of lenses H and a pair of variable apertures or shutters I, one of each being provided for each beam s—s'. The photo-electric cell P is connected in a circuit D similar to the circuit shown in Fig. 1, and may be used with an audio-amplification circuit U, as shown in Fig. 2.

Rotation of the disc C' about its axis will cause the beams s—s' to be interrupted alternately in the well known manner. The speed of rotation of the disc C' is preferably such that the beams will be interrupted at a rate of about 256 interruptions per second. By varying the size of the variable apertures I—I', it is possible to bring about a condition such that the intensity of the beams will be equal at the point p. If desired, the selective reflecting power of the samples S—S' may be determined by the use of a series of colored mono-chromatic filters, which can be placed at the point J. By the use of such filters it will be readily understood that a photometric reading obtained from several filters will enable a color measurement to be secured.

The apparatus shown in Fig. 6 is illustrative of another form of photometer, particularly adapted for reflection measurements and embodying the principles of my invention. As shown in said figure, a lamp or other source of light M' is mounted for movement to and from the samples or reflecting surfaces S—S'. The light from the lamp M' is reflected by the surfaces S—S' as beams s—s' which intersect at the point c'. Interposed between the surfaces S—S' respectively, and the point c', are the lenses H—H', which form an image of the surfaces S—S' at the point upon which the beams s—s' fall upon a photo-electric cell P. The photo-electric cell P, as clearly shown, is located directly in the path of the beam s'. Mounted for rotation upon an axis which extends parallel to the path of movement of the lamp M', is a disc C, similar in construction to the disc C, shown in Figs. 1 and 2 of the drawings. That is to say, the disc C is provided upon one half thereof with a silvered coating to form a mirror reflecting the beam s toward the photo-electric cell P, and the other half of the disc is of clear glass to permit the passage therethrough of the light beams. The photo-electric cell as in the other forms of the invention hereinbefore described, is connected in circuit with a battery E and ear phones F, an audio amplification circuit being preferably interposed between the circuit E and the ear phones F, as described in connection with the other forms of the invention.

The operation of this form of the invention will be readily understood. The disc C is rotated at an audio frequency rate to cause fluctuations to be set up in the circuit D through the medium of the photo-electric cell P. It will be obvious that during each revolution of the disc C, and when the mirrored half of the disc intercepts the beams, the beam s will be reflected so that an image of the reflecting surface will be thrown upon the photo-electric cell, whereas when the clear half of the disc is in the path of the beams s—s', the beams s will pass on through such clear half, without any of its light being thrown upon the photo-electric cell, while, at this time, the beam s' will pass through the clear half and its image will be thrown by its lens H' upon the photo-electric cell. By moving the lamp M' between the surfaces S—S', equal intensity of the light beams can be secured in the well known manner, and when the lamp is moved to a position such that equal intensity is secured, no sound will be heard in the ear phones. If it is desired to measure selective reflection monochromatic filters may be placed in front of the photo-electric cell P.

If it is desired to secure spectro-photometric readings, a spectrometer may be placed, in any of the forms of the invention shown, in front of the photo-electric cell, instead of the filters above referred to.

In the form of the invention shown in Fig. 7 the apparatus is similar to that shown in Fig. 2, with the exception that instead of using the ear phone or other audible detector, a visual signal indicator is substituted. Obviously, any suitable detector of sufficient sensitivity, which will operate satisfactorily with a fluctuating current, may be employed. As one of the principal objects of this invention is to provide an instrument of very great sensitivity, I prefer to employ as a detector, a glow lamp filled with neon gas, because of the fact that these neon lamps exhibit the property of responding practically instantaneously to changes in the current strength of the circuit in which they are connected. Such a lamp is indicated in Fig. 7 by the reference character N, connected in the circuit O, and in which circuit current is induced from the circuit U by means of the transformer R. While it will of course be understood that any suitable type of visible electrical indicating device may be used in place of the neon tube, the invention is, in certain respects, limited to the use of visible detectors which are practically instantaneous in their response to current changes. The ordinary galvanometer and similar indicators in which a coil is employed to actuate an indicator by induced currents is not satisfactory or practical for use with the present invention, because of the lag or dwell which occurs before the indicator is actuated. It will likewise be understood that while I have shown in Figs. 2 and 7 the use of vacuum tubes to step up, or amplify, the current passing to the detector or indicator, any electrical or amplifying device such, for example, as a transformer, may be employed. It will also be understood that many stages of amplification may be used, as desirable, and that transformer, resistance or impedance coupled amplifiers may be used.

When the detector employed is of the audible type the rate of interruption of the beams obviously must be selected such that the vibration rate of the electrical circuits will be within the range of vibration of audible sound, the vibration of 256 interruptions per second referred to hereinbefore being given merely as an illustrative example, in order to enable the principles of the invention to be more readily understood. When, however, a signal of the visible type is employed, obviously the rate of interruption of the beams and therefore of the fluctuations in the electric circuits will be selected at a much lower or slower rate.

The use of the photo-electric cell which is a very sensitive detector of brightness or intensity difference enables electrical indicating devices to be employed for measuring or comparing the intensity or brightness of light beams, and as the observations which may be made by the use of my invention do not in any way whatsoever depend upon the sensitiveness of reaction on the part of the observer to color sensations or brightness sensations, one of the principal factors which contribute largely to the inability to secure greater accuracy in photometric work, and particularly in color measurement is therefore entirely eliminated. The principles of the invention can be applied to light beams having any wave length or combination of wave length to which the photo-electric cell reacts, or to which it is sensitive. That is to say, it can be used as well for measurements in the invisible, ultra-violet or infra-red parts of the spectrum, as in the visible part thereof, as long as the cell is sensitive to the particular type of rays which are under investigation.

The invention can also be applied with equal facility to construction in which only a single light source is used. In Fig. 8 of the drawings, which shows a single beam in place of the two beams, as shown in Figs. 1 to 7 of the drawings, the parts, to which the reference characters M, S, H, D, E, F, W and P are applied, correspond to the similarly designated parts shown in Figs. 1 to 7. In Fig. 8 the beam $k$ from the lamp M is reflected from a single surface S and an image of such surface is thrown by the lens H upon the photo-electric cell P. Interposed between the cell and the lens is a sectored disc C' similar to the disc C' shown in Fig. 5 for interrupting the beam $k$ at an audio-frequency rate. The lamp M is movable along a scale $r$—$t$. A second disc W similar to the disc W shown in Fig. 2 is interposed between the disc C' and the cell P. The manner in which the apparatus of Fig. 8 is used is as follows: A sample placed at S is illuminated by the lamp M and the reflected beam is concentrated upon the cell by the lens H, the beam being interrupted at an audio frequency rate by the disc C' and at slower intervals by the disc W. The lamp M is moved towards $t$ until no sound is heard in the phones F and is then slowly moved towards $r$ until a just perceptible sound is heard. A reading of the position of the lamp or scale B is made. Let this reading be designated $Sy$. A standard is then substituted for the sample and the operation is repeated to obtain a second reading $Sy'$. Then.

$$\left(\frac{Sy}{Sy'}\right)^2$$

is the relative brightness of the sample with respect to the standard.

It will be understood that any of the arrangements shown diagrammatically may be employed for color analysis work, in which case a spectrometer will preferably be employed, the spectrometer being interposed in the beams just ahead of the photo-electric cell.

I claim:

1. A photometer comprising an electrical circuit including a photo-electric cell, means for directing two beams of light in alternation into said cell at an audio frequency rate, and an electrically energized sound reproducing instrument associated with said circuit, and caused to be operated by fluctuations in said circuit resulting from the differences of intensity in the said beams of light, and means interposed before said photo-electric cell to interrupt said beams at relatively longer intervals.

2. A photometer comprising an electrical circuit including a photo-electric cell, means for concentrating a beam of light upon said cell thereby to cause said cell to complete said circuit, means for alternately causing said beam to strike said cell and prevent it from striking said cell at an audio-frequency rate, an interrupter interposed between said last named means and said cell for producing an alternating interruption of said beam at a relatively slow rate, an electrically energized sound reproducing device operatively associated with said circuit, and an electrical amplifier interposed between said circuit and said sound reproducing device.

3. A photometer as set forth in claim 1, in which a plurality of monochromatic filters are provided for movement into or out of the path of said beam.

4. A photometer as set forth in claim 1, in which a spectrometer is interposed, ahead of the photo-electric cell, in the path of the beam.

In testimony whereof I have hereunto set my hand.

CARL W. KEUFFEL.